(No Model.)
J. L. MYERS.
WHEELED HAND RAKE.
No. 514,017. Patented Feb. 6, 1894.
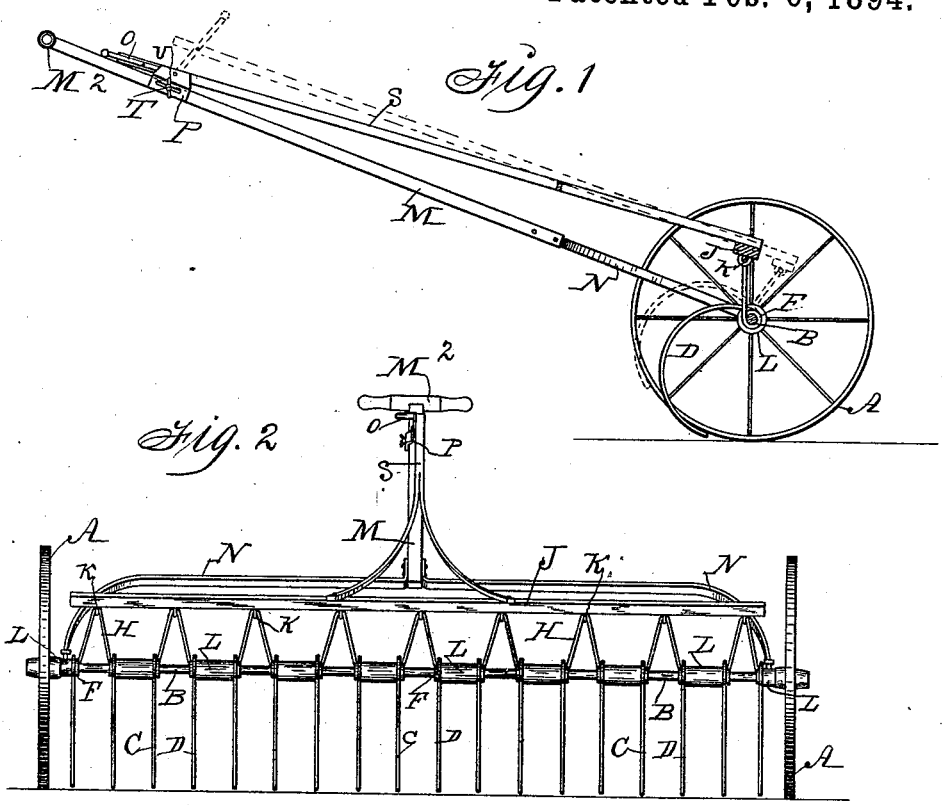
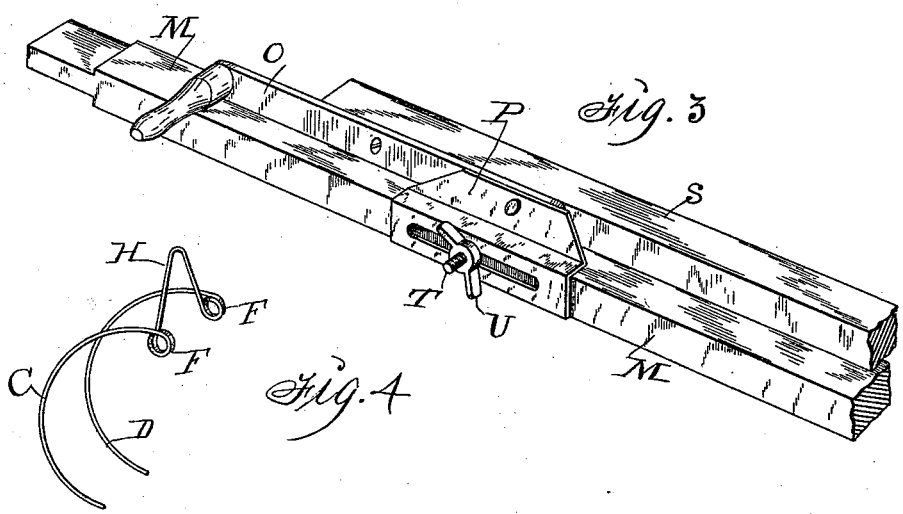
Witnesses:
W. J. Sankey.
R. H. Orwig.
Inventor: Jacob L. Myers,
By Thomas G. Orwig, Attorney.

UNITED STATES PATENT OFFICE.

JACOB L. MYERS, OF DES MOINES, IOWA.

WHEELED HAND-RAKE.

SPECIFICATION forming part of Letters Patent No. 514,017, dated February 6, 1894.

Application filed July 8, 1893. Serial No. 479,980. (No model.)

*To all whom it may concern:*

Be it known that I, JACOB L. MYERS, a citizen of the United States of America, residing at Des Moines, in the county of Polk and State of Iowa, have invented a Wheeled Hand-Rake, of which the following is a specification.

My object is to provide a hand rake adapted to be pushed in advance of the operator to gather hay from the ground so that the person pushing it can walk on the cleared ground and also dump the rake without changing his position relative to the free end of the steering and propelling handle.

My invention consists in the combination with a wheeled truck and rake teeth, pivotally mounted on the axle of said truck, of a handle by means of which the truck is propelled and steered and hand levers by which the rake teeth are turned upon their pivots as required to dump the hay or rubbish accumulated thereon.

My invention consists further in the combination with supporting wheels and an axle supported on the same, of a plurality of duplex rake teeth pivotally mounted on said axle and means manually operated for rotating said rake teeth on said axle.

My invention consists further in the details of construction and combination of parts hereinafter set forth, pointed out in my claims and illustrated by the accompanying drawings, in which—

Figure 1 is a vertical sectional view of the complete rake. Fig. 2 is a front elevation of the complete rake. Fig. 3 is an enlarged perspective view of a portion of the rake handle and the dumping levers and means for adjusting the teeth relative to the surface of the ground. Fig. 4 is a perspective view of a duplex rake tooth detached from the machine.

In the construction of the rake as shown A designates supporting wheels and B an axle journaled in said wheels. A duplex tooth shown in detail at Fig. 4 comprises two curved arms C, D, integrally connected by means of spring coils F with a yoke H. The duplex tooth is pivotally mounted on the axle B by passing said axle through the spring coils F the yoke of each tooth being secured to the head J by means of staples K. Collars L are mounted upon the axle B between the duplex teeth and serve to hold said teeth separated. A steering and propelling handle M having a cross head $M^2$ on one end is fixed to two curved arms N at its forward end said arms being fixed at their other ends to two of the collars L on the axle B. This construction allows the rake teeth to be lifted upward and toward the operator while he is pushing the rake in advance of himself.

A lever O is fulcrumed on an adjustable slide P mounted on the handle M near the cross-head $M^2$ and is pivotally connected near its center to a reciprocating dump rod S the other end of which rod is bifurcated and fixed to the head J. The slide P is slotted and a bolt T passing through the handle M also passes through said slot and has a thumb nut U mounted thereon.

In the practical use of my rake power is manually applied to the cross head $M^2$ and the rake propelled thereby in advance of the operator, the curved arms C, D, of the duplex rake teeth collecting the hay or rubbish until filled. To dump the rake teeth the lever C is lifted and advanced thus moving the head J forward, turning the said teeth upon the axle B lifting the ends of the curved arms C and D rearward and permitting the hay or rubbish accumulated thereon to fall therefrom.

The ends of the rake teeth may be adjusted at any desired height from the ground by adjusting the slide P in different positions on the handle M.

It is obvious that the form of the rake teeth and their numbers may vary and that single teeth may be used in the construction of the rake in place of the duplex teeth shown.

Having thus described my invention, what I claim as new therein, and desire to secure by Letters Patent of the United States therefor, is—

1. A hand rake, adapted to be pushed in advance of the operator, comprising an axle and wheels on the ends of the axle, rake teeth pivoted to the axle and extended above the axle, a rake head connected with the ends of the rake teeth extended above the axle, a steering and propelling handle connected to the axle, a lever connected to the rake head and adjustably fixed to the free end portion of the steering and propelling handle, all arranged and combined to operate in the manner set forth for the purposes stated.

2. In a wheel-supported hand rake, a plurality of duplex rake teeth each comprising curved arms, spring coils and a yoke integrally connected, an axle passed through said coils, wheels supporting said axle, collars on said axle between said teeth, a rake head pivotally connected to the yokes of said teeth, a guiding and propelling handle, a lever fulcrumed on said handle, and a rod connecting said lever with said rake head, as set forth.

JACOB L. MYERS.

Witnesses:
J. RALPH ORWIG,
THOMAS G. ORWIG.